Dec. 15, 1959   R. KORN   2,917,103
TRAPEZOIDAL LINKAGE FOR VEHICLES
Filed July 23, 1956   3 Sheets-Sheet 1

INVENTOR:
Robert Korn
BY: Michael S. Stricker
Agt.

Dec. 15, 1959  R. KORN  2,917,103
TRAPEZOIDAL LINKAGE FOR VEHICLES
Filed July 23, 1956  3 Sheets-Sheet 2

INVENTOR:
Robert Korn
BY: Michael S. Striker
Agt.

Dec. 15, 1959

R. KORN 2,917,103

TRAPEZOIDAL LINKAGE FOR VEHICLES

Filed July 23, 1956

INVENTOR:
Robert Korn

BY:
Michael S. Striker
Agt.

United States Patent Office 2,917,103
Patented Dec. 15, 1959

2,917,103

TRAPEZOIDAL LINKAGE FOR VEHICLES

Robert Korn, Kreiensen, Germany, assignor to Carl Bruns Werkzeugfabrik G.m.b.H., Kreiensen-Harz, Germany Application July 23, 1956, Serial No. 599,622

Claims priority, application Germany August 12, 1955

9 Claims. (Cl. 155—9)

This invention relates to a trapezoidal linkage of the type comprising four coupling points interconnected to form a trapezoidal linkage and a sprung diagonal connection, two of the coupling points lying on one short side of the trapezoidal linkage being spatially fixed, the coupling points of the other short side of the trapezium being spatially movable, and a diagonal connection extending between one spatially fixed and one spatially movable coupling point.

Such a trapezoidal linkage allows parallel oscillation of the load, the springing increasing progressively with the extent of oscillation. Such springing is used, for example, in the support of vehicle seats upon which such heavy demands may be made, that effective cushioning of the seats is not possible. Demands such as these are made in the case of trucks and agricultural tractors. The heavy impacts sustained are normally taken up by the suspension of ordinary bearing joints, connecting the base of the seat with its supporting leg. In the case of soft springing of such seats, there arises the disadvantage that, after a downwards movement, they tend to spring back the same amount, producing a most unpleasant bouncing effect for the seated person. This bouncing movement increases with unevenness of the ground.

With trapezoidal linkage as proposed herein approximate parallel positioning of the supported weight, e.g. a seating member, and an uninterrupted cushioning of the bounce, is achieved. According to the present invention, in a trapezoidal linkage of the type described the diagonal connection is incapable of deformation about its axis but is secured to move longitudinally of its length and tangentially to a circle between the spatially fixed coupling points about one of said fixed coupling points in such a way that the angle, formed between the diagonal connection and the side of the trapezoidal linkage extending from the same fixed coupling point to which the diagonal connection is attached, remains the same in all positions of the system within a predetermined range of oscillation. The axially rigid diagonal connection, i.e. incapable of bending, may consist of a telescopic guide-rod cushioned by a helical spring. The parallel arrangement of an oil filled shock absorber as guide-rod with a helical spring is still more advantageous. In this case the absorption capacity of the connection may be regulated by the oil shock-absorber as well as by the helical spring tension.

For especially severe shocks elastic stops, such as rubber buffers, may be provided in the trapezoidal linkage according to the invention, which stops limit the amount of upward and downward play of the system. In this way the system does not suffer shocks of a dangerous magnitude in the event of the system exceeding its normal springing distance, but rather are such shocks relatively smoothly absorbed.

The invention will now be further described by way of example with reference to the accompanying drawings which show its use on the springing of a motor vehicle seat such as are customary on tractors. In the drawings:

Figure 4 shows an end elevation of the seat according to Figure 2.

Figure 1:
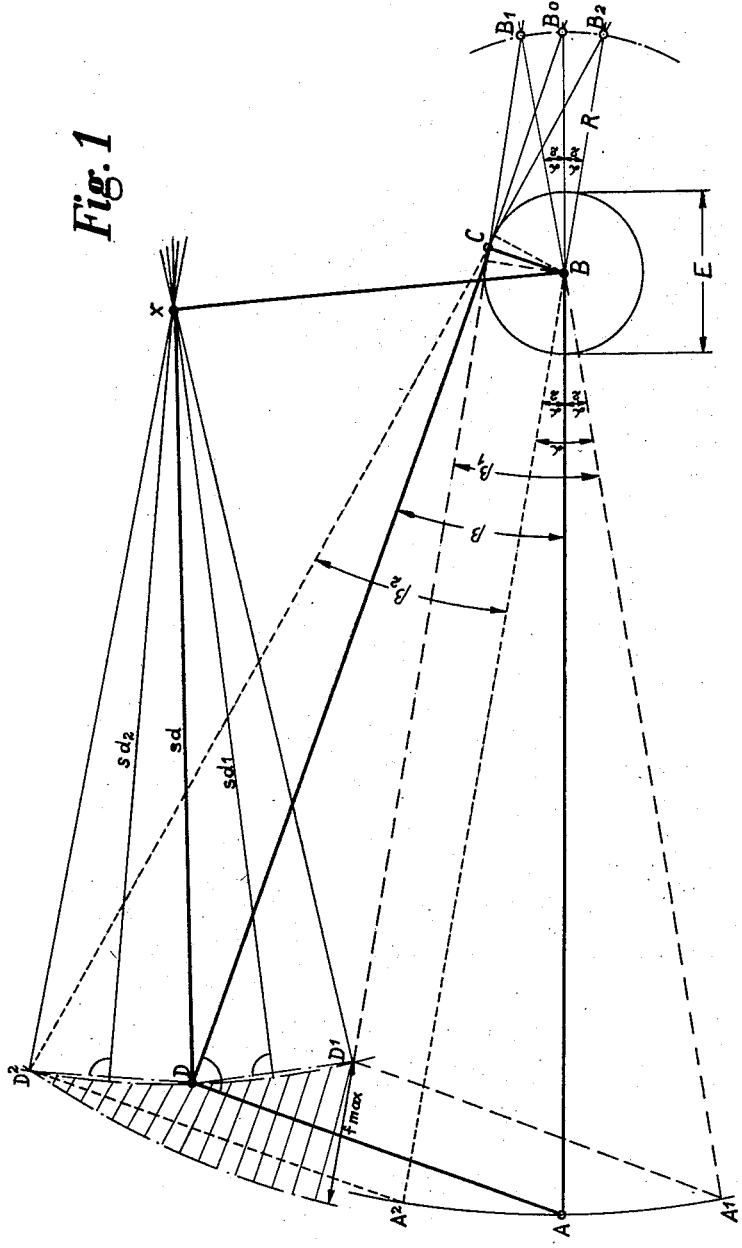
Figure 1 shows diagrammatically the geometrical conditions for determining the position of the fourth coupling point of the trapezoidal linkage after choosing the remaining three coupling points and the clearance location of the diagonal connection with respect to one of the spatially fixed coupling points.
Figure 2:
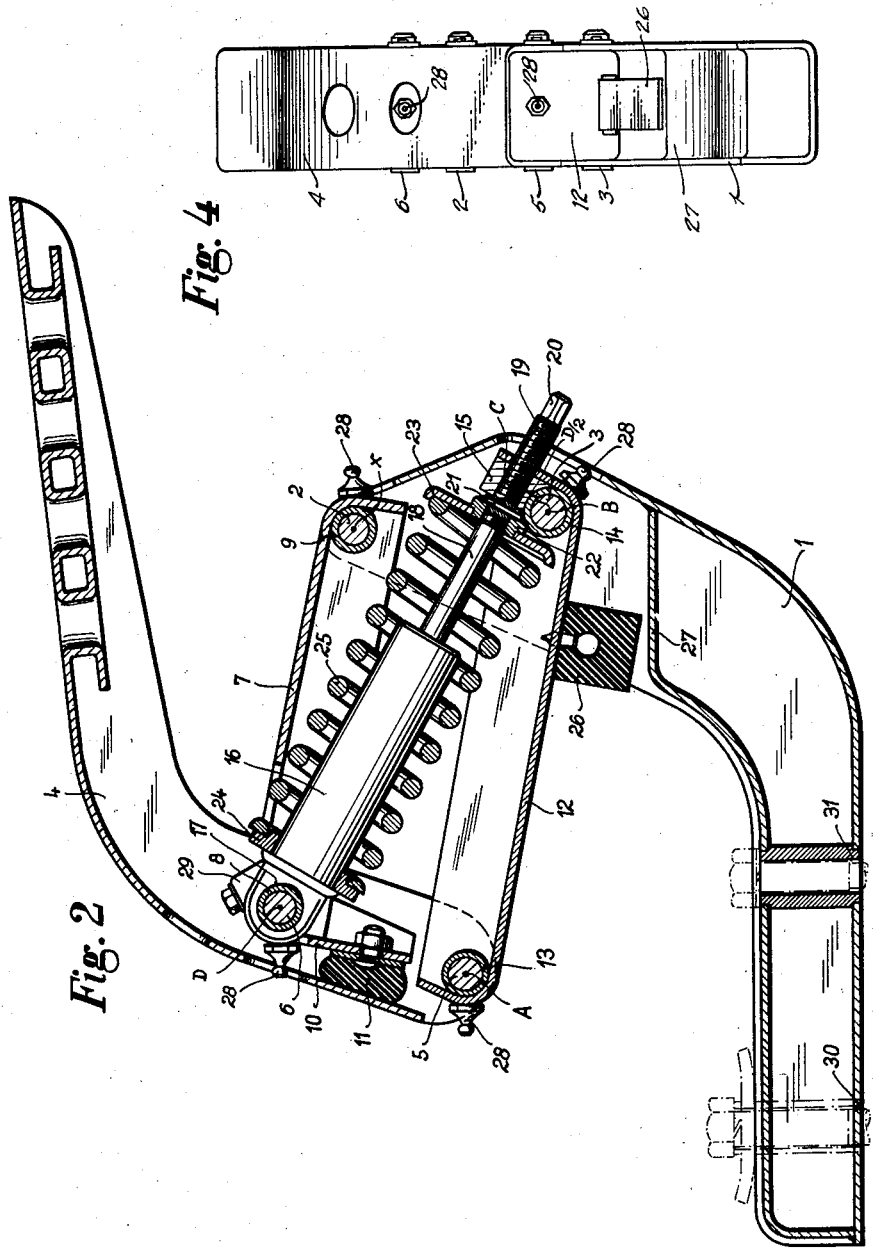
Figure 2 shows a section through an oscillating seat embodying a trapezoidal linkage constructed according to the principle illustrated in Figure 1 in a normal position.

The calculations for determining the position of the coupling points are shown in Figure 1 at twice the scale shown in the practical embodiment in Figure 2, for the sake of clarity. In Figure 1 the points A, B, D and X are the inter-articulated angles of the trapezoidal linkage. Points X and B are spatially fixed and are moreover connected to the leg of the seat. Points A and D are both spacially movable and support the seat.

If the relationship of points A, B and D and the clearance of point C from coupling B has been established, the angle $\beta$ between the side AB and the diagonal connection CD is constant within a limited range so that $\beta = \beta_1 = \beta_2$. The fourth coupling point X is located in the following way: Given the clearance C—B as 0.5 E, side AB of the trapezium projected beyond point B must intersect at point Bo the diagonal connection DC projected beyond the tangent junction C. By displacing the free short side of the trapezoidal linkage about an angle of $$\pm \frac{\alpha}{2}$$

the points $B_1$ and $B_2$, lying with Bo on an arc of centre B and radius $R = 1.5E$, are obtained.

The figure now comprised within points A, B, C, D is now distorted about the angle $\beta = \beta_1 = \beta_2$ with B as pivot, i.e. beyond the ordinary positions corresponding to the upward and downward swing, sufficiently to allow the points A1 and A2 (the displaced point A) to meet the projected lines B1—B and B2—B. Connecting point D must, during the above construction, move along a circular path into a position D1 or D2 on other side of D and the centre about which this path is described constitutes the desired fourth connecting point X. Point X is located by drawing chords between points D1 and D, and between D and D2, and by erecting perpendiculars $sd1$ and $sd2$ thereon. The intersection of these perpendiculars with one another, and with a further perpendicular $sd$ established upon chord $D_1$—$D_2$ gives the location of desired fourth connecting point X. This point may also be located by calculation rather than by construction. The permissible maximum angle of displacement $\alpha$ of this system is determined by the clearance between points C—B. The shaded surface in Figure 1 lying and bounded by arc $D_1$—D—$D_2$, the arc through $D_2$ with radius $D_2$—C, and by the prolongation of the connecting line C—$D_1$ beyond $D_1$ is at the same time a diagram of the spring strength of the diagonal connection, which increases with the displacement of point $D_2$ through D towards $D_1$. It can now be seen how the spring strength increases from a zero value in springing position $D_2$ to a maximum value fmax in springing position $D_1$.

By this method coupling point X with respect to given points A, B, D securing point C of the diagonal connection to the fixed point B, is conclusively determined.

All these points recur in the practical embodiment shown in Figure 2. Points X and B are shown therein respectively as fixed pins 2 and 3 arranged on a leg 1. Points A and D form the other narrow side of the trapezium and become pins 5 and 6, attached to an arm of seat 4. Said arm also constitutes the short side of the trapezium just as the prolongation of leg 1 forms the other short side. Pins 6 and 2 are linked together by an angle member 7, which rests on pivot pins 6 and 2, carried respectively by bearings 8 and 9. Angle member 7 passes round pin 6 and supports a rubber buffer 11 upon one side, which buffer abuts against the arm of seat 4 at the position of greatest upwards thrust, as is shown in the drawing, thereby limiting the upward recoil distance. Pins 5 and 3 are linked by an angle plate 12 which is attached to the pivot pins 5 and 3 through bearings 13 and 14 respectively. Bearing 14 is extended to form an upwardly inclined butt 15 which houses the diagonal connection of the system in a threaded bore. This connection consists of a telescopic shock absorber and a helical spring, the assembly being located tangentially with respect to the coupling point B at a clearance of $E/2$ therefrom. The other end of the diagonal connection is linked by attaching means to coupling point D, inasmuch as one end of cylinder 16 of the telescopic absorber is attached by means of a bearing eye 17 to pin 6. Piston rod 18 of the telescopic shock absorber is formed at its extremity as a threaded spindle 19 engaging in butt 15 and developing into a square section 20, by means of which it can be turned within a threaded bore in butt 15. Threaded spindle 19, in the example shown has an abutment 21 against which a bush 22 carrying a dished plate 23 rests. Similarly, a stepped fluted ring 24 is fitted at the end of cylinder 16 adjacent coupling point D. Between plate 23 and ring 24 a helical spring 25 is held as a compression spring parallel to the telescopic shock absorber. If rod 18 is now turned by means of the square section 20, the threaded spindle 19 moves axially within the bore of butt 15 and plate 23 moves along the axis of the shock absorber, thus either shortening or lengthening the overall length of helical spring 25. The absorption capacity of the diagonal connection is thereby varied, and with it, that of the whole seat.

The telescopic shock absorber may be one of the oil filled type. By suitable adjustment of the overflow bores in oil shock absorbers, absorption capacity can be adapted as desired within broad limits.

Figure 3:
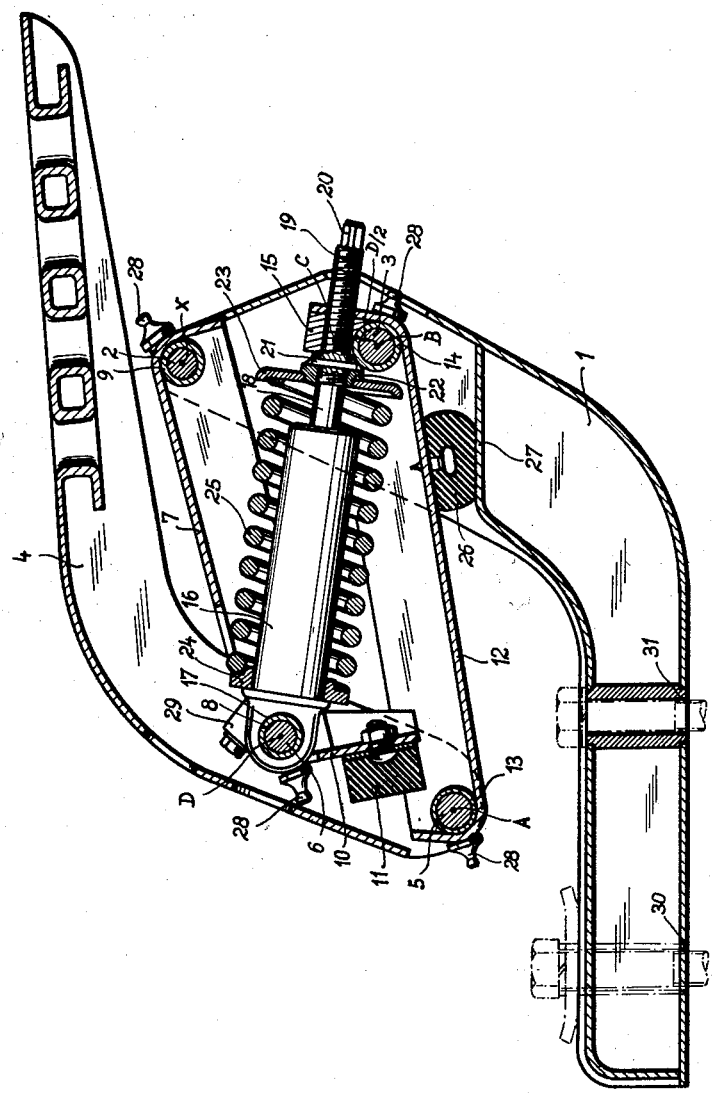
Figure 3 is a view corresponding to Figure 2 but with the seat in its lowermost position.

A resilient stop for limiting the down-thrust is attached, in the example shown, to the connecting plate 12. It consists of a rubber buffer 26 which acts against wall 27 of the forward end of leg 1 when an extreme downward thrust occurs. The relative position of all the parts of the seat and the associated system is shown in Figure 3, and the deformation of buffer 26 is apparent.

All the moving joints of the system are lubricated by grease nipples 28, whilst the oil replenishing box for telescopic shock the absorber is designated 29. The seat leg may be attached to the vehicle chassis by means of bores 30 and 31 in a manner facilitating subsequent removal.

The seat shown swings in parallel position for a stroke of some 65–70 mm. The shock absorber produces an uninterrupted absorption of the springing, and prevents any repeated bounce of the seat. The transmission ratio of the seat support to compression spring and shock absorber is 2:1, giving a soft springing with a progressive motion. By adjustment of the initial stress of compression spring 25, as previously explained, the seat of the example shown may be arranged to support a weight of from about 40 to 140 k./gs. Naturally these details are given purely by way of example and are at all times dependent upon the particular construction of the trapezoidal linkage. The coupling connections consist substantially of drawn sheet metal parts. In this way the construction is simple and cheap.

I claim:

1. Seat suspension comprising, in combination, a trapezoidal structure including four links, and four pivot means pivotally connecting said links; a rigid support fixedly connected to one of said links for holding the same and the two pivot means associated therewith in fixed positions so that the other two pivot means are movable and another of said links located between said two movable pivot means is movable to generally parallel positions; a substantially horizontal seat member secured to said other link so as to be movable between a plurality of horizontal positions; a first attaching means rigidly connected to a third link of said links adjacent one of said fixed pivot means and having a threaded bore; a second attaching means turnably connected to the movable pivot means which is connected to the fourth link of said links; and a connecting means extending substantially diagonally with respect to said trapezoidal structure and including a telescopic shock absorber having at one end a threaded rod screwed into said threaded bore of said first attaching means, and being secured at the other end thereof to said second attaching means, and spring means located immediate said first and second attaching means for urging said trapezoidal structure into positions in which said seat member is in a desired horizontal position, so that by turning of said threaded rod the tension of said spring means is adjusted.

2. A seat suspension as set forth in claim 1 wherein said threaded rod has at said one end thereof a portion projecting beyond said threaded bore, said portion having a non-circular head adapted to be engaged by a wrench.

3. A seat suspension as set forth in claim 2 wherein said spring means is a coil spring surrounding said telescopic shock absorber, and including a dished plate secured to said threaded rod and engaging one end of said spring means.

4. Seat suspension comprising, in combination, a rigid support; a trapezoidal structure including two substantially horizontal longer links and two substantially upright shorter links, and four pivot means pivotally connecting said links, one of said upright links being fixedly connected to said support so that the two pivot means associated therewith are fixed and the other two pivot means are movable whereby the other upright link is movable to generally parallel positions, said other upright link having a substantially horizontal extension located above said trapezoidal structure and constituting a seat member movable between a plurality of horizontal positions, the lower link of said horizontal links having a transverse upwardly projecting rigid extension formed with a threaded bore; a telescopic shock absorber extending diagonally with respect to said trapezoidal structure and having at one end a threaded rod screwed into said threaded bore, and being turnably secured at the other end thereof to the movable pivot means which is connected to the upper link of said horizontal links; and a coil spring surrounding said telescopic shock absorber and abutting against the ends of the same for urging said trapezoidal structure into a position in which said seat member is in a desired horizontal position.

5. Seat suspension comprising, in combination, a trapezoidal structure including four links and four articulating means connecting said links for relative angular movement; a rigid support for holding one of said links and the two articulating means associated therewith stationary so that the other two articulating means and another link located between said other two articulating means are movable to generally parallel positions; a substantially horizontal seat member secured to said other link so as to be movable between a plurality of substantially horizontal positions; an attaching means rigidly connected to a third link of said links in the region of one of said stationary articulating means and extending at an angle to said third link; and connecting means extending substantially diagonally with respect to said trapezoidal structure and including an elongated expansible and contractible shock-absorber means having one end secured to said attaching means spaced from said one stationary articulating means, and having the other end thereof turnably connected to the movable articulating means which is connected to the fourth link of said links, and elongated compression spring means acting at one end against said linkage in the region of said last mentioned movable articulating means and acting at the other end against said attaching means spaced from said one stationary articulating means for urging said trapezoidal structure into positions in which said seat member is in a desired horizontal position.

6. Seat suspension comprising, in combination, a trapezoidal structure including four links and four articulating means connecting said links for relative angular movement; a rigid support for holding one of said links and the two articulating means associated therewith stationary so that the other two articulating means and another link located between said other two articulating means are movable to generally parallel positions; a substantially horizontal seat member secured to said other link so as to be movable between a plurality of substantially horizontal positions; an attaching means rigidly connected to a third link of said links in the region of one of said stationary articulating means and extending at an angle to said third link; and connecting means extending substantially diagonally with respect to said trapezoidal structure and including an elongated expansible and contractible shock-absorber means having one end mounted on said attaching means spaced from said one stationary articulating means displaceable in longitudinal direction of said shock-absorber means, and having the other end thereof turnably connected to the movable articulating means which is connected to the fourth link of said links, means for securing said one end of said shock-absorber means in axially displaced positions to said attaching means so that said trapezoidal structure can be adjusted to different positions with said shock-absorber means in its normal position, and elongated compression spring means acting at one end against said linkage in the region of said last mentioned movable articulating means and acting at the other end against said attaching means spaced from said one stationary articulating means for urging said trapezoidal structure into positions in which said seat member is in a desired horizontal position.

7. Seat suspension comprising, in combination, a trapezoidal structure including four links and four articulating means connecting said links for relative angular movement; a rigid support for holding one of said links and the two articulating means associated therewith stationary so that the other two articulating means and another link located between said other two articulating means are movable to generally parallel positions; a substantially horizontal seat member secured to said other link so as to be movable between a plurality of substantially horizontal positions; an attaching means rigidly connected to a third link of said links in the region of one of said stationary articulating means and extending at an angle to said third link; connecting means extending substantially diagonally with respect to said trapezoidal structure and including an elongated expansible and contractible shock-absorber means having one end mounted on said attaching means spaced from said one stationary articulating means displaceable in longitudinal direction of said shock-absorber means, and having the other end thereof turnably connected to the movable articulating means which is connected to the fourth link of said links, means for securing said one end of said shock-absorber means in axially displaced positions to said attaching means so that said trapezoidal structure can be adjusted to different positions with said shock-absorber means in its normal position, and elongated compression spring means acting at one end against said linkage in the region of said last-mentioned movable articulating means and acting at the other end against said attaching means spaced from said one stationary articulating means for urging said trapezoidal structure into positions in which said seat member is in a desired horizontal position; first resilient buffer means located between said third link and said support; and a second resilient buffer means located between said other link and said fourth link for limiting movement of said trapezoidal structure in two end positions.

8. Seat suspension comprising, in combination, a trapezoidal structure including four links and four articulating means connecting said links for relative angular movement; a rigid support for holding one of said links and the two articulating means associated therewith stationary so that the other two articulating means and another link located between said other two articulating means are movable to generally parallel positions; a substantially horizontal seat member secured to said other link so as to be movable between a plurality of substantially horizontal positions; an attaching means rigidly connected to a third link of said links in the region of one of said stationary articulating means and extending at an angle to said third link; and connecting means extending substantially diagonally with respect to said trapezoidal structure and including an elongated expansible and contractible shock-absorber means having one end mounted on said attaching means spaced from said one stationary articulating means displaceable in longitudinal direction of said shock-absorber means, and having the other end thereof turnably connected to the movable articulating means which is connected to the fourth link of said links, means for securing said one end of said shock-absorber means in axially displaced positions to said attaching means so that said trapezoidal structure can be adjusted to different positions with said shock-absorber means in its normal position, and elongated compression spring means abutting at one end against said other end of said shock-absorber means in the region of said last mentioned movable articulating means and abutting at the other end against said one end of said shock-absorber means spaced from said one stationary articulating means for urging said trapezoidal structure into positions in which said seat member is in a desired horizontal position.

9. Seat suspension comprising, in combination, a trapezoidal structure including four links, and four pivot means pivotally connecting said links; a rigid support fixedly connected to one of said links for holding the same and the two pivot means associated therewith in fixed positions so that the other two pivot means are movable and another link located between said two movable pivot means is movable to generally parallel positions; a substantially horizontal seat member secured to said other link so as to be movable between a plurality of horizontal positions; a first attaching means rigidly connected to a third link of said links adjacent one of said fixed pivot means; a second attaching means turnably connected to the movable pivot means which is connected to the fourth link of said links; first resilient buffer means located between said third link and said support; second resilient buffer means located between said other link and said fourth link, said first and second buffer means limiting movement of said trapezoidal structure in two end positions; and a connecting means extending diagonally with respect to said trapezoidal structure and including a longitudinally expansible and compressible element secured at the ends thereof to said first and second attaching means respectively, and a spring means located intermediate said first and second attaching means for urging said trapezoidal structure into positions in which said seat member is in a desired horizontal position.

References Cited in the file of this patent

UNITED STATES PATENTS

| 2,621,919 | Utz | Dec. 16, 1952 |
| 2,663,355 | Harms | Dec. 22, 1953 |
| 2,678,210 | Reuter | May 11, 1954 |

FOREIGN PATENTS

| 147,275 | Great Britain | July 16, 1920 |
| 779,781 | France | Jan. 19, 1935 |
| 591,334 | Great Britain | Aug. 14, 1947 |
| 491,059 | Canada | Mar. 10, 1953 |